Dec. 19, 1967  M. W. BERWALD ET AL  3,358,751
HEAT SINK
Filed April 19, 1965
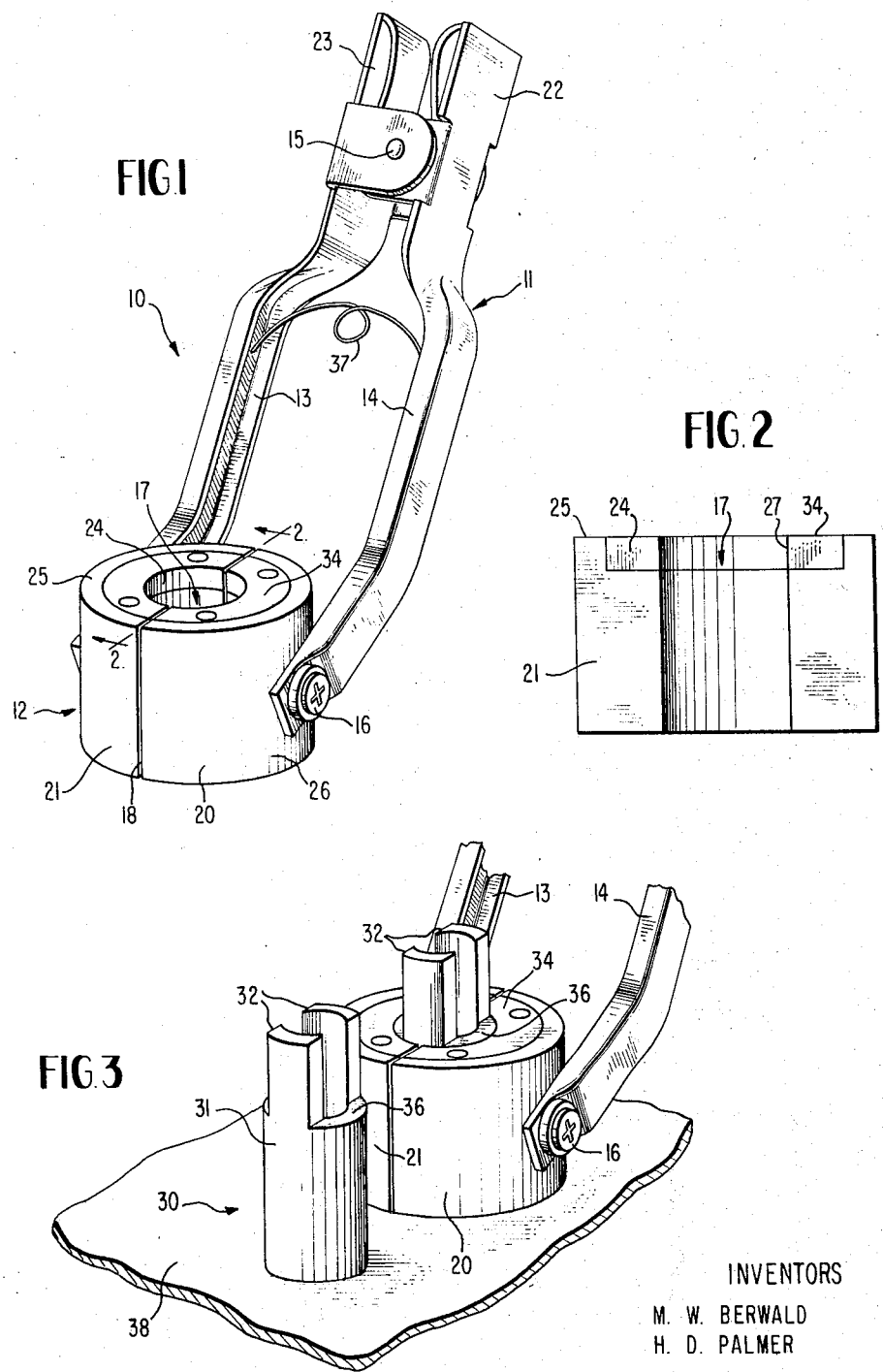
INVENTORS
M. W. BERWALD
H. D. PALMER
BY Samuel R. Genca
AGENT United States Patent Office 3,358,751
Patented Dec. 19, 1967

3,358,751
HEAT SINK
Marvin W. Berwald, El Cajon, and Harold D. Palmer, Santee, Calif., assignors to General Dynamics Corporation, a corporation of Delaware
Filed Apr. 19, 1965, Ser. No. 448,999
11 Claims. (Cl. 165—185)

This invention relates to soldering operations in general and more particularly to heat sinks and methods employed in soldering operations.

Heretofore in the art of soldering wires to terminal members attached to a terminal board, a place soldering technique has been employed. During such prior art soldering methods, an iron tip of a heat instrument was positioned to contact a terminal connection and the solder was melted to fuse a wire to the terminal. In instances when it was desirous to form a solder joint in accordance with predetermined specifications, a great deal of human dexterity was required.

It is therefore a primary object of the present invention to provide a soldering method for regulating the flow of heat within a terminal member by which heat is absorbed from all portions of a terminal member closest to a terminal board and heat is evenly distributed throughout all portions of the same terminal member in a zone spaced from such terminal board.

A further object of the present invention is to provide a method for soldering wires to a barrel-shaped terminal in which a solder joint is formed at the top part only of the barrel-shaped terminal member.

A secondary object of the present invention is to provide a heat regulating tool which may be utilized to assist a workman in forming a solder joint which complies with required solder specifications.

It is an additional object of the present invention to provide a heat sink to cool the portion of a terminal member adjacent a terminal board during a soldering operation.

Another object of the present invention is to provide a heat sink for soldering applications which enables an even distribution of heat over the portion of a terminal member furthest from a terminal board.

Another object of the present invention is to provide an instrument employed in soldering wires to bifurcated terminal connecting members mounted on an epoxy-type terminal board in which control of crazing and blossoming of the terminal board is maintained while wire wicking and solder spillage is prevented.

With the foregoing and other objects in view, the invention resides in the following specification and claims, certain embodiments and details of construction of which are illustrated by the specification when considered with the accompanying drawings in which:

FIGURE 1 is a perspective view of an exemplary instrument which may be employed as a heat sink embodying basic features within the contemplation of the present invention;

FIGURE 2 is a view taken along line 2—2 of FIGURE 1, and

FIGURE 3 is a sectional view in perspective illustrating the instrument of FIGURE 1 in a functional condition.

Referring now more particularly to the drawings, an instrument, which may be employed as a heat sink when soldering a wire to a cylindrically-shaped terminal connection, is generally designated by reference numeral 10 in FIGURE 1. Instrument 10 is provided with a handle 11 and a heat regulating member 12. Regulating member 12 is provided with a top surface 25, a bottom surface, not shown, and an interconnecting cylindrical surface 26. Handle 11 is provided with arms 13 and 14 pivotally connected at a point 15 between the ends of the arms. The arms are shaped to form a forked section for connection to the exterior surface 26 of member 12. Arms 13 and 14 are attached to member 12 by any suitable connecting means 16; however, a screw and washer arrangement, as illustrated, enables rotational movement of handle 11 with respect to member 12 and is therefore a preferred form of connecting means.

Heat regulating member 12 is provided with a cylindrical central passage 17 extending axially through the member from the top surface to the bottom surface. Member 12 is bisected at 18 and 19 along a plane parallel with the cylindrical axis of the member to form two opposing half sections 20 and 21. Arm 13 is connected to half section 20, and arm 14 is connected to half section 21. Member 12 is formed primarily from a metal of substantially high thermal conductivity. Referring to both FIGURES 1 and 2 it may be observed that heat regulating member 12 is provided with a recessed area surrounding central passage 17 adjacent the top surface of member 12. A washer type unit 24 of heat insulating material is suitably secured within the recessed area at the top of member 12. A central hole 27 through unit 24 is adapted for direct alignment with the central passage through member 12. Hole 27 thus forms a part of passage 17. Unit 24 is additionally severed to form two half sections which are directly aligned with half sections 20 and 21 of member 12.

Additionally, arms 13 and 14 are provided with extensions 22 and 23, respectively, extending from pivot point 15 away from member 12. Extensions 22 and 23 are provided to enable opposite, pivotal, manual displacement of the forked portion of arms 13 and 14 of handle 11. Preferably, handle 11 is provided with a suitable biasing means, such as a tension spring 37 to move arms 13 and 14 in a direction toward each other. Thus, as a result of the biasing spring acting on arms 13 and 14 and due to the particular connection of the arms to half sections 20 and 21, the said half sections are normally biased toward a contiguous relationship.

In FIGURE 3 there is illustrated an upper perspective view of a section of a terminal board 38 having any number of terminal connecting members 30 attached thereto. Heat sink instrument 10 of FIGURE 1 may be particularly adapted for application to the terminal members 30, as represented in FIGURE 3. Terminal members 30 are provided with a barrel-type lower section 31 and a forked, or bifurcated, upper section 32.

Lower section 31 of terminal member 30 is positioned within passage 17 of heat regulating member 12 by pressing extensions 22 and 23 toward each other to separate half sections 20 and 21. Preferably, the outside diameter of all portions of lower section 31 is fractionally larger than the diameter of the corresponding portions of passage 17. With a fractional difference in diameters, as described, contact is assured between substantially the entire surface defined by passage 17 and the outside surface of lower section 31 of member 30. Additionally, lower section 31 and bifurcated upper section 32 are preferably provided with a centrally located axially extending hole into which a wire may be inserted.

When instrument 10 is positioned in functional relationship with respect to terminal connecting member 30, as illustrated in FIGURE 3, the upper surface 34 of unit 24 is preferably flush with the upper surface 36 of the barrel-type lower section 31.

In a preferred embodiment of the present invention, the major part of member 12 is formed primarily from a metal of substantially high thermal conductivity. During a soldering operation in which relatively high temperatures are imparted to terminal connecting member 30, the highly thermal conductive portion of member 12 serves as a heat sink to prevent crazing and blossoming of the terminal board. Additionally, in the preferred form of the present invention unit 24 is formed from a material of low thermal conductivity, such as Teflon, and is provided to evenly distribute the applied heat around the top of the barrel-type lower section 31 of terminal member 30.

As a result of the above described even heat distribution, both a complete and smooth solder flow on the top of section 31 is accomplished and a satisfactory fillet around the wire being soldered to the terminal member is achieved. Consequently, with a high heat conducting metal contiguous with the bottom of section 31 and with an even heat distribution around the top of section 31, a solder flow filling only the upper portion of section 31 may be accomplished and wire wicking and internal solder flow within the barrel hole are controlled. Additionally, with a flush relationship between the upper surface 34 of unit 24 and the upper surface 36 of barrel-type section 31, solder spillage on the outside of the barrel section is prevented.

Although the heat regulating member 12 of instrument 10, the passage 17 in member 12, and the terminal connecting members 30 are all described and illustrated as generally cylindrically shaped members, it is recognized that other physical forms, or combination of forms, might be employed equally well without departing from the essence of this invention. It is also recognized that different size terminal members 30 may be encountered; therefore, varying sizes for heat regulating members 12 and for passage 17 may be employed. Preferably, therefore, removable connecting means 16 are provided to enable handle 11 to be disconnected from heat regulating member 12. In this manner, the same handle 11 may be employed with various sized or shaped heat regulating members or with members having different sized or shaped passages.

It is further recognized that the sectional character of heat regulating member 12 need not be present to achieve a basic purpose taught by the present invention. The heat regulating characteristics of the present invention may be equally attained by a one piece member. In the event that the end of a wire having no obstructions at the opposite end is to be soldered to terminal member 30, a one-piece heat regulating member 12 may be adapted with a passage allowing insertion of terminal member 30 by sliding the regulating member over the terminal member. However, in the event that the difference in the coefficient of thermal expansion of terminal member 30 and heat regulating member 12 is substantially great, it may be necessary to wait until both members have somewhat cooled before instrument 10 may be removed. Consequently, a separable, sectional heat regulating member is a preferred embodiment allowing quick application and removal of the instrument. However, although instrument 10 is further described and represented as having a bisected heat regulating member and a handle with a pair of arms, it is recognized that any number of arms and any number of sections may be employed without departing from the essence of this invention.

The invention may therefore be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A heat sink for terminal soldering applications comprising a heat regulating member, said member including a terminal passage extending therethrough, and a handle portion connected to said heat regulating member, said heat regulating member being provided with a first portion of high thermal conductivity for establishing a zone of heat dissipation and a second portion of low thermal conductivity for establishing a zone of even heat distribution.

2. A heat sink according to claim 1 wherein said heat regulating member is split longitudinally into two half sections.

3. A heat sink according to claim 2 wherein said second portion of low thermal conductivity is formed of Teflon material.

4. A heat sink for terminal soldering applications comprising a separable, sectional heat regulating member including a terminal passage extending therethrough and being defined by the sections of said heat regulating member, a plurality of arms with connecting means to secure each of said arms to a different section of said heat regulating member, said heat regulating member being provided with a first portion of high thermal conductivity for establishing a zone of heat dissipation and a second portion of low termal conductivity for establishing a zone of even heat distribution.

5. A heat sink according to claim 4 wherein the transverse dimensions of said terminal passage are fractionally smaller than the corresponding dimensions of said terminal.

6. A heat sink according to claim 4 wherein said heat regulating member is bisected and a pair of arms is connected to the resulting half sections.

7. A heat sink according to claim 6 wherein said arms are spring biased to move said half sections toward a substantially contiguous relationship.

8. A heat sink according to claim 4 wherein said second portion of low thermal conductivity is formed of Teflon material.

9. A heat sink according to claim 4 wherein said arms are biased to move said sections of said heat regulating member toward a substantially contiguous relationship.

10. A heat sink for application in soldering wire to terminal members mounted on terminal boards comprising a heat conducting member having top and bottom surfaces and including a passage extending through said conducting member, said passage establishing an opening in said top surface and an opening in said bottom surface, said conducting member being bisected along a plane extending between said top and bottom surfaces forming equal half sections about said passage, said top surface of each half section of said conducting member being provided with a recess, said recess being positioned about said opening in said top surface, a heat insulating unit positioned within said recess including a hole extending therethrough and coextensive with said passage, said passage and said hole defining an interior surface substantially corresponding to the exterior surface of said terminal members but having fractionally smaller transverse dimensions, and a pair of spring biased arms with removable connecting means to secure each arm to said side surfaces of opposite half sections of said conducting member, said connecting means enabling rotation of said arms with respect to said conducting member.

11. A heat sink for application in soldering wire to barrel-shaped terminal members mounted on epoxy-type terminal boards comprising a bisected, cylindrical heat conducting member having a top surface and a bottom surface, said conducting member being bisected along a plane parallel with its cylindrical axis and including a cylindrical passage centrally located and axially extending therethrough, said passage being provided with a diameter fractionally smaller than the corresponding diameter of said terminal member, a circular recess in the top surface of said member having a diameter less than the diameter of said conducting member and greater than the diameter of said passage, a cylindrical bisected Teflon unit positioned with said recess and aligned therewith and including a uniform cylindrical hole extending therethrough and coextensive with said passage, and a pair of spring biased arms with removable connecting means to secure said arms to the exterior cylindrical surface of opposite half sections of said conducting member, said connecting means enabling rotation of said arms with respect to said conducting member.

References Cited

UNITED STATES PATENTS

| | | | |
|---|---|---|---|
| 3,178,905 | 4/1965 | Boynton | 228—59 |
| 3,291,476 | 12/1966 | Calkin | 228—57 |

JOHN F. CAMPBELL, *Primary Examiner.*

M. FAIGUS, *Assistant Examiner.*